(12) United States Patent
Ling et al.

(10) Patent No.: US 12,309,782 B2
(45) Date of Patent: May 20, 2025

(54) APPARATUS AND METHOD OF UCI MULTIPLEXING IN PUCCH RESOURCES FOR MULTIPLE TRPS

(71) Applicant: Lenovo (Beijing) Limited, Beijing (CN)

(72) Inventors: Wei Ling, Changping (CN); Chenxi Zhu, Haidian District (CN); Bingchao Liu, Changping District (CN); Lingling Xiao, Haidian District (CN)

(73) Assignee: Lenovo (Beijing) Limited, Beijing (CN)

( * ) Notice: Subject to any disclaimer, the term of this patent is extended or adjusted under 35 U.S.C. 154(b) by 726 days.

(21) Appl. No.: 17/630,386

(22) PCT Filed: Aug. 7, 2019

(86) PCT No.: PCT/CN2019/099650
§ 371 (c)(1),
(2) Date: Jan. 26, 2022

(87) PCT Pub. No.: WO2021/022519
PCT Pub. Date: Feb. 11, 2021

(65) Prior Publication Data
US 2022/0287030 A1    Sep. 8, 2022

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04L 5/0053* (2013.01); *H04W 72/23* (2023.01); *H04W 72/56* (2023.01)

(58) Field of Classification Search
CPC ..... H04W 72/21; H04W 72/23; H04W 72/56; H04L 1/1812; H04L 5/0053;
(Continued)

(56) References Cited

U.S. PATENT DOCUMENTS

| 2015/0181534 A1* | 6/2015 | Andersson | ............ H04W 72/23 370/311 |
| 2019/0132861 A1 | 5/2019 | Koorapaty et al. | |

(Continued)

FOREIGN PATENT DOCUMENTS

WO    2018174677 A1    9/2018

OTHER PUBLICATIONS

"International Preliminary Report on Patentability", PCT Application No. PCT/CN2019/099650, Feb. 17, 2022, 6 pages.
(Continued)

*Primary Examiner* — Michael K Phillips
(74) *Attorney, Agent, or Firm* — FIG. 1 Patents

(57) ABSTRACT

Apparatus and methods of Uplink Control Information (UCI) multiplexing in Physical Uplink Control Channel (PUCCH) resources for multiple Transmit Receive Points (TRPs) are disclosed. The apparatus includes: a processor that determines a first group PUCCH resources associated with a first identity for transmitting a first set of UCIs associated with the first identity, and a second group of PUCCH resources associated with a second identity for transmitting a second group of UCIs associated with the second identity, wherein the first set of UCIs and the second set of UCIs are expected to be transmitted in a same time interval; and a third group of PUCCH resources comprising at least one PUCCH resource selected from the first group of PUCCH resources and the second group of PUCCH resources; and a transmitter that transmits the third group of PUCCH resources in the time interval.

20 Claims, 12 Drawing Sheets

(51) Int. Cl.
*H04L 5/00* (2006.01)
*H04W 72/23* (2023.01)
*H04W 72/56* (2023.01)

(58) Field of Classification Search
CPC ... H04L 1/1671; H04L 1/1854; H04L 5/0064; H04L 5/0055; H04L 5/0037
See application file for complete search history.

(56) References Cited

U.S. PATENT DOCUMENTS

| | | | |
|---|---|---|---|
| 2019/0261361 A1* | 8/2019 | Xiong | H04W 72/02 |
| 2020/0228248 A1* | 7/2020 | Islam | H04L 5/0055 |
| 2020/0314900 A1* | 10/2020 | Hosseini | H04W 74/0858 |
| 2020/0351129 A1* | 11/2020 | Kwak | H04W 80/02 |
| 2021/0211241 A1* | 7/2021 | Xiong | H04L 1/1896 |
| 2021/0227555 A1* | 7/2021 | Lin | H04L 5/0053 |
| 2022/0006570 A1* | 1/2022 | Lee | H04W 72/543 |
| 2022/0279559 A1* | 9/2022 | Wong | H04L 5/0053 |
| 2022/0330290 A1* | 10/2022 | Khoshnevisan | H04W 72/569 |
| 2024/0430900 A1* | 12/2024 | El Hamss | H04L 1/1864 |
| 2025/0081118 A1* | 3/2025 | MolavianJazi | H04W 52/146 |

OTHER PUBLICATIONS

"International Search Report and Written Opinion", PCT Application No. PCT/CN2019/099650, May 9, 2020, 8 pages.

Qualcomm Incorporated, "Remaining Issues on DL/UL Scheduling, Processing Time and HARQ management", 3GPP TSG-RAN WG1 Meeting #92, R1-1802842, Athens, Greece [retrieved Apr. 19, 2022]. Retrieved from the Internet <https://www.3gpp.org/ftp/TSG_RAN/WG1_RL1/TSGR1_92/Docs/?sortby=namerev>., Mar. 2, 2018, 11 pages.

VIVO, "Discussion on HARQ operation for NR-U", 3GPP TSG RAN WG1 Meeting #96bis, R1-1904067, Xi'an, China [retrieved Apr. 19, 2022]. Retrieved from the Internet <https://www.3gpp.org/ftp/TSG_RAN/WG1_RL1/TSGR1_96b/Docs/?sortby=sizerev>., Apr. 12, 2019, 7 pages.

* cited by examiner

APPARATUS AND METHOD OF UCI MULTIPLEXING IN PUCCH RESOURCES FOR MULTIPLE TRPS

FIELD

The subject matter disclosed herein relates generally to wireless communication and more particularly relates to, but not limited to, apparatus and methods of Uplink Control Information (UCI) multiplexing in Physical Uplink Control Channel (PUCCH) resources for multiple Transmit Receive Points (TRPs).

BACKGROUND

The following abbreviations and acronyms are herewith defined, at least some of which are referred to within the following description.

Third Generation Partnership Project ("3GPP"), 5th Generation ("5G"), New Radio ("NR"), 5G Node B ("gNB"), Long Term Evolution ("LTE"), LTE Advanced ("LTE-A"), Evolved Node B ("eNB"), Universal Mobile Telecommunications System ("UMTS"), Worldwide Interoperability for Microwave Access ("WiMAX"), Evolved UMTS Terrestrial Radio Access Network ("E-UTRAN"), Wireless Local Area Networking ("WLAN"), Orthogonal Frequency Division Multiplexing ("OFDM"), Single-Carrier Frequency-Division Multiple Access ("SC-FDMA"), Downlink ("DL"), Uplink ("UL"), User Entity/Equipment ("UE"), Network Equipment ("NE"), Hybrid Automatic Repeat Request Acknowledgement ("HARQ-ACK"), Radio Access Technology ("RAT"), Physical Downlink Control Channel ("PDCCH"), Physical Downlink Shared Channel ("PDSCH"), Physical Uplink Control Channel ("PUCCH"), Physical Uplink Shared Channel ("PUSCH"), Control Resource Set ("CORESET"), Channel State Information ("CSI"), Channel State Information Reference Signal ("CSI-RS"), Downlink Control Information ("DCI"), Semi-Persistent Scheduling ("SPS"), Scheduling Request ("SR"), Synchronization Signal Block ("SSB/SS Block"), Time-Division Multiplexing ("TDM"), Transmit Receive Points ("TRP"), Uplink Control Information ("UCI"). As used herein, "HARQ-ACK" may represent collectively the Positive Acknowledge (ACK) and the Negative Acknowledge (NAK). ACK means that a TB is correctly received while NAK means a TB is erroneously received.

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs are studied for NR Release 16. A TRP is an apparatus to transmit and receive signals, and is controlled by a gNB through the backhaul between the gNB and the TRP.

As a fundamental building component to enable the NR system, Physical Uplink Control Channel (PUCCH) is mainly utilized to convey a set pf Uplink Control Information (UCIs), including Hybrid Automated Repeat Request Acknowledgement (HARQ-ACK) which is feedback in response to downlink (DL) data transmission; Scheduling Request (SR) which is used to request resource for uplink (UL) data transmission; and Channel State Information (CSI) report which is used for link adaptation and downlink (DL) data scheduling.

In NR Release 15, only downlink transmission from a single TRP is supported. NR Release 16 will support multiple TRPs. For TRPs with non-ideal backhaul (i.e., the backhaul between different TRPs may have a large delay), UCIs corresponding to different TRPs should be separately transmitted to the respective TRPs. Each TRP may have its PUCCH resource group to transmit its own UCIs.

According to NR Release 15, all the PUCCH resources carrying different UCIs should be considered together by multiplexing or dropping to pick up at most two PUCCH resources for transmission. That is, a UE can transmit at most two non-overlapping PUCCH resources to a gNB having only one TRP in the same time interval (e.g. in a slot). If a UE's capability that the maximum number of transmitted PUCCH resources within a slot in NR Release 16 is the same as that in NR Release 15, at most two PUCCH resources may be transmitted from the UE to all of the multiple TRPs.

It is possible that one PUCCH resource carrying the UCI(s) transmitting to one TRP may overlap with another PUCCH resource carrying the UCI(s) transmitting to another TRP, thereby causing a collision on the UE side. For example, as the scheduling of one TRP is unknown to another TRP because of the large delay of the backhaul between the two TPRs, it is possible that one PUCCH resource carrying HARQ-ACK corresponding to a Downlink Control Information (DCI) associated with one TRP overlapped with one PUCCH resource carrying HARQ-ACK corresponding to a DCI associated with another TRP, causing a collision on the UE side, since the UCIs corresponding to different TRPs cannot be multiplexed. Therefore, dropping of a PUCCH resource on the UE side is inevitable in some cases, and such dropping is unknown on the TRP side which may increase complexities involved in detecting the UCIs on the TRP side. The term "overlap" here may refer to the fact that the two PUCCH resources occupy at least one same slot or symbol, i.e. an overlap in the time domain or a time conflict. In some cases, it does not matter whether there is any overlap in the frequency domain.

In addition, according to NR Release 15, there is a UCI multiplexing scheme which may cause PUCCH resource redetermination and result in further collisions on the UE side. The UCI multiplexing scheme in NR Release 15 is designed for a single TRP. This is not suitable for NR Release 16 that supports multiple TRPs, because the PUCCH transmission for multiple TRPs may be very complex on both the UE side and the TRP side. Therefore, a mechanism or method for UCI multiplexing for multiple TRPs is desirable.

SUMMARY

According to a first aspect, there is provided an apparatus including: a processor that determines a first group of Physical Uplink Control Channel (PUCCH) resources associated with a first identity for transmitting a first set of Uplink Control Information (UCIs) associated with the first identity, and a second group of PUCCH resources associated with a second identity for transmitting a second group of UCIs associated with the second identity, wherein the first set of UCIs and the second set of UCIs are expected to be transmitted in a same time interval; and a third group of PUCCH resources including at least one PUCCH resource selected from the first group of PUCCH resources and the second group of PUCCH resources; and a transmitter that transmits the third group of PUCCH resources in the time interval.

According to a second aspect, there is provided an apparatus including: a receiver that receives a first Physical Uplink Control Channel (PUCCH) resource carrying a set of Uplink Control Information (UCIs) in a time interval; and a processor that decodes the first PUCCH resource to obtain the set of UCIs; wherein, upon determining that Hybrid Automatic Repeat Request Acknowledgement (HARQ-ACK) is expected in the time interval, the processor decodes only the first PUCCH resource received in the time interval.

According to a third aspect, there is provided an apparatus including: a receiver that receives a first Physical Uplink Control Channel (PUCCH) resource carrying a set of Uplink Control Information (UCIs) in a time interval; and a processor that decodes the first PUCCH resource to obtain the set of UCIs; wherein, upon determining that Hybrid Automatic Repeat Request Acknowledgement (HARQ-ACK) is expected in the time interval and that the HARQ-ACK is not successfully decoded in the first PUCCH, the processor controls the receiver to receive a second PUCCH resource in the time interval.

According to a fourth aspect, there is provided a method including: determining, by a processor, a first group of Physical Uplink Control Channel (PUCCH) resources associated with a first identity for transmitting a first set of Uplink Control Information (UCIs) associated with the first identity, and a second group of PUCCH resources associated with a second identity for transmitting a second group of UCIs associated with the second identity, wherein the first set of UCIs and the second set of UCIs are expected to be transmitted in a same time interval; and a third group of PUCCH resources including at least one PUCCH resource selected from the first group of PUCCH resources and the second group of PUCCH resources; and transmitting, by a transmitter, the third group of PUCCH resources in the time interval.

According to a fifth aspect, there is provided a method including: receiving, by a receiver, a first Physical Uplink Control Channel (PUCCH) resource carrying a set of Uplink Control Information (UCIs) in a time interval; and decoding, by a processor, the first PUCCH resource to obtain the set of UCIs; wherein, upon determining that Hybrid Automatic Repeat Request Acknowledgement (HARQ-ACK) is expected in the time interval, the processor decodes only the first PUCCH resource received in the time interval.

According to a sixth aspect, there is provided a method including: receiving, by a receiver, a first Physical Uplink Control Channel (PUCCH) resource carrying a set of Uplink Control Information (UCIs) in a time interval; and decoding, by a processor, the first PUCCH resource to obtain the set of UCIs; wherein, upon determining that Hybrid Automatic Repeat Request Acknowledgement (HARQ-ACK) is expected in the time interval and that the HARQ-ACK is not successfully decoded in the first PUCCH, the processor controls the receiver to receive a second PUCCH resource in the time interval.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
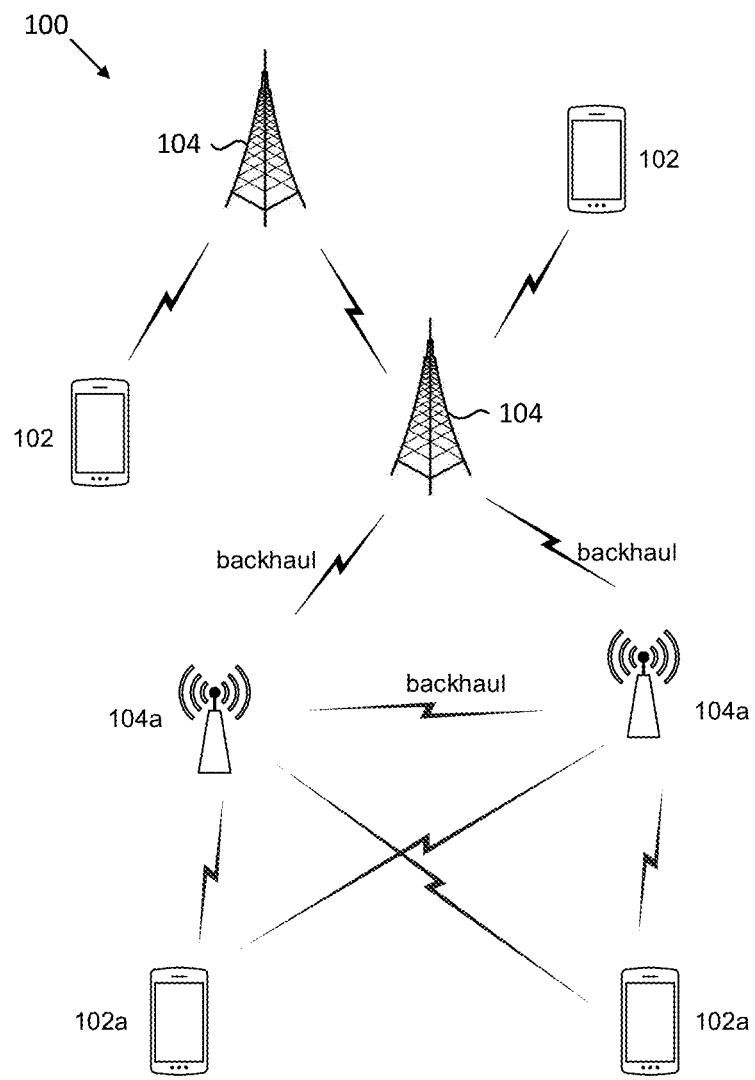
FIG. 1 is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable Compact Disc Read-Only Memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a 'second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100 with multiple TRPs 104a. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the UL using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Direct or indirect communication link between two or more NEs 104 may be provided.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB.

Figure 2:
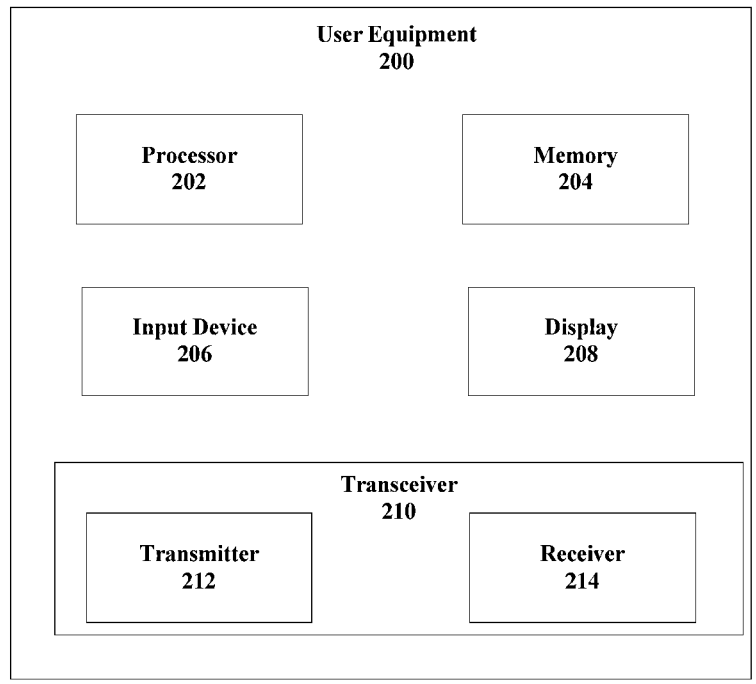
FIG. 2 is a schematic block diagram illustrating components of user equipment (UE) according to one embodiment.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or a similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and the display 208 may form a touchscreen or a similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
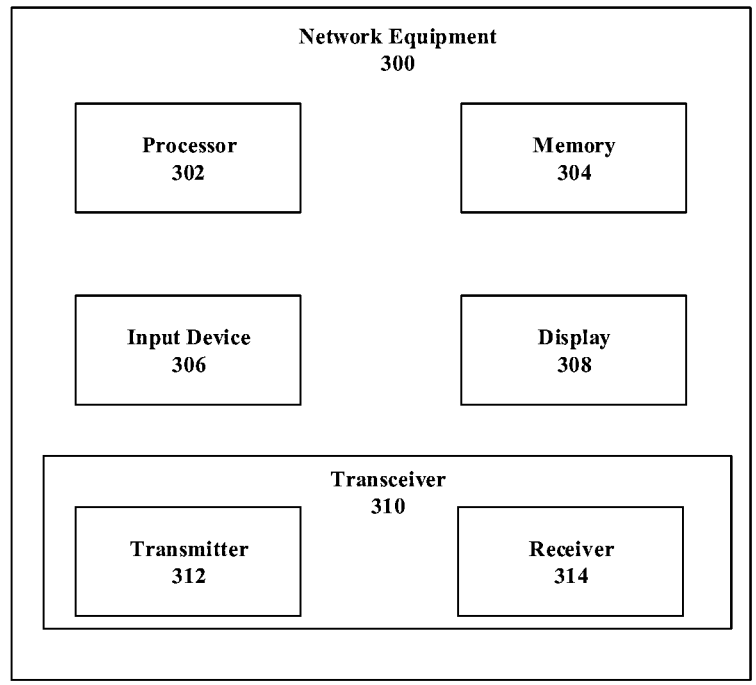
FIG. 3 is a schematic block diagram illustrating components of network equipment (NE) according to one embodiment.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. For example, the processor 302 may control the transceiver 310 to receive a PUCCH resource and/or a PUSCH resource. In another example, the processor 302 may control the transceiver 310 to transmit DL signals containing various configuration data to the UE 200, as described above.

The transceiver 310, in one embodiment, is configured to communicate wirelessly with the UE 200. In certain embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, wherein the transceiver 310 includes a transmitter 312 and a receiver 314 for each cell or cell sector.

In NR Release 16, multiple TRPs are supported. Different UCIs associated with different TRPs should be transmitted separately in the case of non-ideal backhaul. Thus, UCIs associated with different TRPs should be distinguished on the UE side.

A CORESET is a time-frequency resource from which a Physical Downlink Control Channel (PDCCH) is transmitted, and each CORESET can only be configured to correspond to one TRP. Therefore, each TRP may be associated with a CORESET group, or may be identified by a CORESET group.

UCIs transmitted by a UE include Hybrid Automated Repeat Request Acknowledgement (HARQ-ACK), Channel State Information (CSI) and Scheduling Request (SR). For HARQ-ACK, it may be HARQ-ACK corresponding Semi-Persistent Scheduling (SPS) Physical Downlink Shared Channel (PDSCH) that is activated by a PDCCH, or HARQ-ACK corresponding to PDSCH scheduled by a PDCCH. In both cases, it is associated with a PDCCH. Thus, the HARQ-ACK may always be associated with a CORESET group that can identify a TRP.

For each CSI, it may be associated with a TRP either by configuring a CORESET group ID in the CSI report configuration or by configuring a CORESET group ID in the Synchronization Signal Block (SSB)/Channel State Information Reference Signal (CSI-RS) resources configuration which is associated with the CSI report.

For SR, its PUCCH resource is configured in higher layers and it does not matter which TRP it is associated with, unlike the other UCIs. Thus, SR is not discussed in detail in the disclosure. Based on the above analysis, each UCI (HARQ-ACK or CSI) may be associated with a TRP on the UE side.

Accordingly, the UE should use a PUCCH resource associated with the TRP to transmit UCI(s) associated with the TRP. Each UCI is either configured by higher layers (CSI) or indicated by DCI (HARQ-ACK) with a PUCCH resource associated with the corresponding TRP. When there is PUCCH resource redetermination for UCI multiplexing, it should be ensured that the re-selected PUCCH resource is associated with the same TRP. Hence, each TRP is associated with a PUCCH resource group where each PUCCH resource in this group is transmitted to the associated TRP. According to the above analysis, each PUCCH resource is associated with a PUCCH resource group; each PUCCH resource group is associated with a TPR; and each TRP is associated with a CORESET group. Therefore, each PUCCH resource is associated with a CORESET group.

According to an embodiment, a method of multiplexing UCIs in PUCCH resources for multiple TRPs is disclosed. PUCCH resource(s) for multiplexing UCIs per TRP is first determined; and at most two of these determined PUCCH resources for multiple TRPs are then determined to be transmitted by the UE according to certain conditions, such as overlapping of the determined PUCCH resources for different TRPs, the maximum number of PUCCH resources capable of transmission on the UE side, or the maximum number of PUCCH resources associated with one TRP.

In the first step or Step 1, multiplexing of UCIs, and determining of PUCCH resource(s) for multiplexing UCIs per TRP, are performed. There are three cases of UCI multiplexing for one TRP (TRP 1, for example) on the UE side.

Case 1-1

In Case 1-1, the UCIs for the TRP include only CSI.

The UCI multiplexing for the TRP (e.g. TRP 1) in this case depends on whether a multi-CSI-PUCCH resource list is configured.

Case 1-1a: The multi-CSI-PUCCH resource list is configured by higher layers.

If the multi-CSI-PUCCH resource list is configured by higher layers, only one PUCCH resource is determined for CSI transmission per TRP (e.g. TRP 1). The UE first gathers all the CSIs associated with TRP 1, and selects one PUCCH resource from the PUCCH resources which are associated with TRP 1 in the multi-CSI-PUCCH resource list according to the payload size of all the CSIs associated with TRP 1. In order to avoid the overlapping of PUCCH resources carrying CSIs for different TRPs, the gNB may configure that the PUCCH resources in the multi-CSI-PUCCH resource list associated for different TRP are Time Division Multiplexed (TDM'ed).

Case 1-1b: The multi-CSI-PUCCH resource list is not configured by higher layers.

If the multi-CSI-PUCCH resource list is not configured by higher layers, at most two non-overlapping PUCCH resources associated with TRP 1 are determined for CSI transmission associated with TRP 1 in a way similar to that specified in NR Release 15. The term "overlap" or "overlapping" in the disclosure may refer to the fact that the two PUCCH resources occupy at least one same slot or symbol, i.e. an overlap in the time domain or a time conflict. In some cases, it does not matter whether there is any overlap in the frequency domain.

Therefore, at most two PUCCH resources per TRP is determined in Case 1-1.

Case 1-2

In Case 1-2, the UCIs for the TRP include CSI and HARQ-ACK corresponding to SPS PDSCH.

The UCI multiplexing for the TRP (e.g. TRP 1) in this case is also different depending on whether the multi-CSI-PUCCH resource list is configured. If the multi-CSI-PUCCH resource list is configured, the HARQ-ACK corresponding to SPS PDSCH is multiplexed in the PUCCH resource determined as described in Case 1-1a, that is, the PUCCH resource selected from the PUCCH resources which are associated with TRP 1 in the multi-CSI-PUCCH resource list according to the payload size of all the CSIs associated with TRP 1.

If the multi-CSI-PUCCH resource list is not configured, the HARQ-ACK corresponding to SPS PDSCH is multiplexed in the PUCCH resource carrying CSI of the higher priority determined as described in Case 1-1b. This simplifies the UCI multiplexing on the UE side compared to that in NR Release 15. In NR Release 15, only when the PUCCH resource configured for the HARQ-ACK transmission corresponding to SPS PDSCH is overlapped with the at most two PUCCH resources determined, the HARQ-ACK is then multiplexed in the PUCCH resource carrying CSI of the higher priority.

Therefore, one PUCCH resource per TRP is determined in Case 1-2.

Case 1-3

In Case 1-3, the UCIs for the TRP include HARQ-ACK corresponding to PDSCH with PDCCH scheduling and other UCIs. Other UCIs may be the HARQ-ACK corresponding to SPS PDSCH and/or the CSI.

The HARQ-ACK corresponding to PDSCH with PDCCH scheduling and other UCIs are multiplexed in one PUCCH resource which is determined by the payload size of all the UCI bits including the HARQ-ACK corresponding to PDSCH with PDCCH scheduling and other UCIs, and a PUCCH resource indicator in the corresponding DCI or PDCCH. This simplifies the UCI multiplexing on the UE side compared to that in NR Release 15. In NR Release 15, only when the PUCCH resource determined to carry the HARQ-ACK and other PUCCH resources carrying other UCIs are overlapped in time domain, the HARQ-ACK and other UCIs are multiplexed together to be transmitted in a new PUCCH resource. However, in the disclosure, the HARQ-ACK corresponding to PDSCH with PDCCH scheduling and other UCIs can always be multiplexed in one PUCCH resource.

Therefore, one PUCCH resource per TRP is determined in Case 1-3.

In order to increase the probability of transmitting HARQ-ACK for Case 1-2 and Case 1-3 in view of the possibility of overlapping of PUCCH resources for multiple TRPs, a candidate PUCCH resource may be introduced. The candidate PUCCH resource may be obtained based on the determined PUCCH resource, and may carry HARQ-ACK only in these cases to enhance the PUCCH resource selection on the UE side. For Case 1-2, the candidate PUCCH resource is a PUCCH resource configured by higher layers for the HARQ-ACK corresponding to SPS PDSCH. For Case 1-3, the candidate PUCCH resource is a PUCCH resource determined by a payload size of all the HARQ-ACK corresponding to PDSCH with PDCCH scheduling and the PUCCH resource indicator in the corresponding PDCCH. In some embodiments, the PUCCH resource determined (or the determined PUCCH resource) in Case 1-2 or Case 1-3 is not simultaneously transmitted with the corresponding candidate PUCCH resource since the two carry the same HARQ-ACK information. In addition, the PUCCH resource determined in Case 1-2 or Case 1-3 has a higher priority compared to the corresponding candidate PUCCH resource.

Therefore, when candidate PUCCH resources are introduced, two PUCCH resources, i.e. one determined PUCCH resource and one candidate PUCCH resource per TRP, are available for selection in Case 1-2 and Case 1-3.

In the second step or Step 2, PUCCH resource(s) is selected by the UE for transmission from the PUCCH resources determined for each of the multiple TRPs associated with UCIs expected to be transmitted in the same time interval. For simplicity purpose, only two TRPs are assumed in the examples below. The approaches of this disclosure may be easily adapted for systems with more than two TRPs.

When there are UCIs expected to be transmitted in the same time interval from one UE to two TRPs (e.g. TRP 1 or a first identify 104a, and TRP 2 or a second identity 104b), the UE first determines the PUCCH resources for multiplexing UCIs for each of TRP 1 and TRP 2, i.e. a first group of PUCCH resources for transmitting a first set of UCIs associated with TRP 1 and a second group of PUCCH resources for transmitting a second set of UCIs associated with TRP 2; and the UE then selects PUCCH resource(s) from the first and second groups for transmission.

In Step 1, when candidate PUCCH resources are not introduced or used, only in Case 1-1b, there are at most two PUCCH resources determined per TRP, and there is only one PUCCH resource determined per TRP in Case 1-1a, Case 1-2 and Case 1-3. In Step 2, there are three different cases of selecting PUCCH resource(s) to be transmitted by the UE when candidate PUCCH resources are not introduced or used: Case 2-1, Case 2-2 and Case 2-3.

In the following cases, the selection of PUCCH resource(s) to be transmitted in Step 2 may be based on priority. The priority of PUCCH resource can be determined according to the UCI carried in it, and the priority of UCI is in the order of (from high to low): i) HARQ-ACK corresponding to PDSCH with PDCCH scheduling (which may be called as HARQ-ACK with DCI), ii) HARQ-ACK corresponding to SPS PDSCH (which may be called as HARQ-ACK without DCI), iii) CSI of higher priority, and iv) CSI of lower priority. Thus, the HARQ-ACK with DCI is of the highest priority and CSI of lower priority is of the lowest priority. In addition, when candidate PUCCH resources are introduced or used, the priority of the determined PUCCH resource in Case 1-2 or Case 1-3 is always higher than its corresponding candidate PUCCH resource.

Case 2-1

In Case 2-1, there are two PUCCH resources determined for TRP 1 and two PUCCH resources determined for TRP 2 in Step 1.

According to Step 1, this case corresponds to the situation that there are only CSI expected to be transmitted for both TRP 1 and TRP 2 and the multi-CSI-PUCCH resource list is not configured. There are two ways to determine the final PUCCH resource(s) to be transmitted according to different limitations.

Limitation 1: The maximum number of PUCCH resources transmitted in a time interval is 2 on the UE side; and there is no limitation of number PUCCH resources on the TRP side.

Figure 4A:
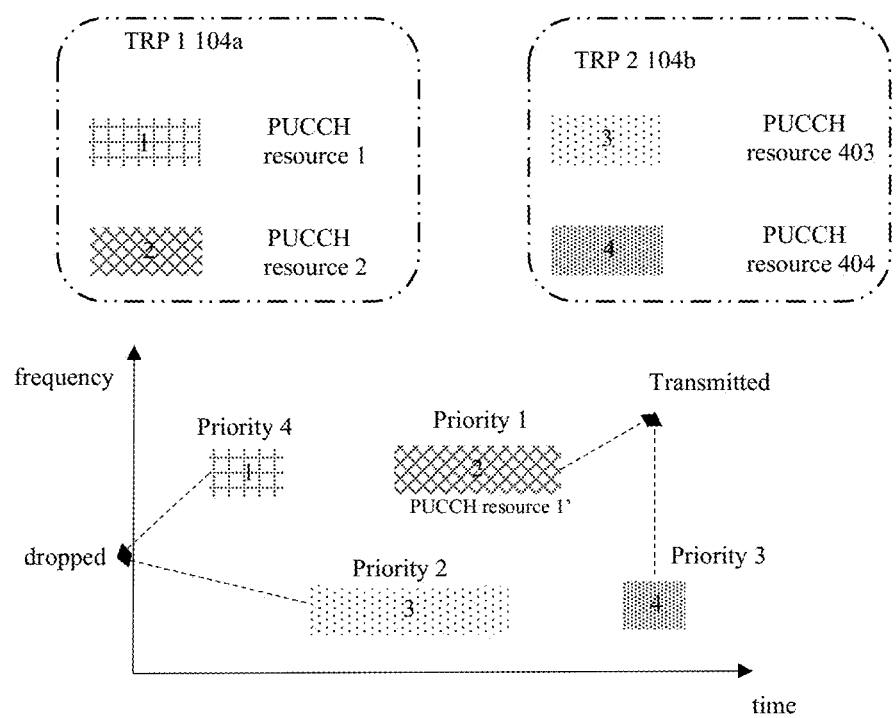
FIG. 4a is a schematic diagram illustrating UCI multiplexing in PUCCH resources for multiple TRPs according to one embodiment.

At most two non-overlapping PUCCH resources may be selected from these four PUCCH resources based on a priority of each PUCCH resource. FIG. 4a illustrating UCI multiplexing in PUCCH resources for multiple TRPs shows an example of Case 2-1 with Limitation 1. In the example, it is assumed that PUCCH resource 1 and PUCCH resource 2 are determined for CSI only transmission associated with TRP 1 104a; PUCCH resource 3 and PUCCH resource 4 are determined for CSI only transmission associated with TRP 2 104b; and their priorities are as shown in FIG. 4a. The graph in FIG. 4a illustrates the time-frequency space where PUCCH resources are transmitted. The priorities of the four PUCCH resources (i.e. the priority of the CSIs carried in the PUCCH resources in this scenario) may be calculated in the same way as that in NR Release 15. In this example and other examples in this disclosure, a PUCCH resource is of a higher priority when the value of priority is smaller, as shown in all the figures. Here, PUCCH resource 2 labeled with Priority 1 in FIG. 4a is assumed to be the PUCCH resource having the highest priority.

The UE first, among all the PUCCH resources determined in Step 1, selects one PUCCH resource, named as PUCCH resource 1' (which is PUCCH resource 2 in this scenario), which carries the CSI of the highest priority (e.g. Priory 1), to be transmitted. Then, the UE selects at most one PUCCH resource from the remaining PUCCH resources which are not overlapped with PUCCH resource 1' to be transmitted. The selected at most PUCCH resource is of the highest priority among the remaining PUCCH resources which are not overlapped with PUCCH resource 1'. If there are two PUCCH resources corresponding to different TRPs having the same priority (carrying CSIs of the same priority) to choose from, the UE may select the PUCCH resource associated with the lowest index of CORESET group or it is up to UE's implementation. In the example shown in FIG. 4a, after selecting PUCCH resource 1' with Priority 1, there are two remaining PUCCH resources that are not overlapped with PUCCH resource 1': PUCCH resource 1 and PUCCH resource 4. Since PUCCH resource 4 (Priority 3) has a higher priority than PUCCH resource 1 (Priority 4), the UE further selects PUCCH resource 4 for transmission. Thus, in the example, PUCCH resource 2 and PUCCH resource 4 are selected to be transmitted by the UE and the other two PUCCH resources are dropped.

It should be noted that it is possible that the UE may select two PUCCH resources associated with a same TRP in this scenario.

Limitation 2: The maximum number of PUCCH resources transmitted in a time interval is 2 on the UE side; and the maximum number of PUCCH resource associated with one TRP is 1.

In this scenario, the UE determines a plurality of PUCCH resource pairs, each PUCCH resource pair consisting of a PUCCH resource associated with one TRP (e.g. TRP 1 104a) and a PUCCH resource associated with the other TRP (e.g. TRP 2 104b), and selects a non-overlapping pair from the PUCCH resource pairs. The non-overlapping pair includes two PUCCH resources that are not overlapped in time domain. That is, the UE selects two PUCCH resources that are associated with different TRPs and are not overlapped to be transmitted.

Figure 4B:
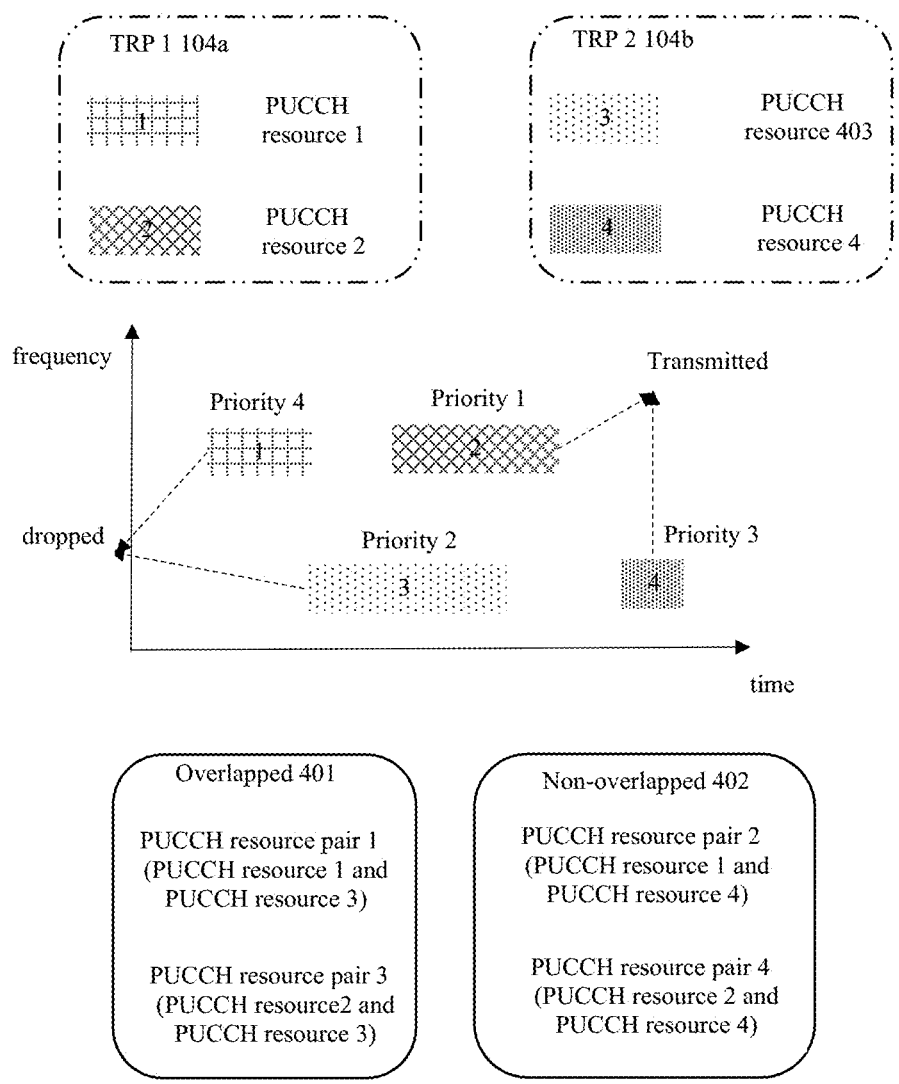
FIG. 4b is a schematic diagram illustrating UCI multiplexing in PUCCH resources for multiple TRPs according to one embodiment.

FIG. 4b illustrating UCI multiplexing in PUCCH resources for multiple TRPs is an example of Case 2-1 with Limitation 2. In the example, it is assumed that PUCCH resource 1 and PUCCH resource 2 are determined for CSI only transmission associated with TRP 1 104a; PUCCH resource 3 and PUCCH resource 4 are determined for CSI only transmission associated with TRP 2 104b; and their priorities are as shown in FIG. 4b. There are 4 PUCCH resource pairs composed of two PUCCH resources associated with different TRPs: PUCCH resource pair 1 (PUCCH resource 1, PUCCH resource 3), PUCCH resource pair 2 (PUCCH resource 1, PUCCH resource 4), PUCCH resource pair 3 (PUCCH resource 2, PUCCH resource 3), and PUCCH resource pair 4 (PUCCH resource 2, PUCCH resource 4). Since PUCCH resource 1 and PUCCH resource 2 are not overlapped and PUCCH resource 3 and PUCCH resource 4 are not overlapped, there is always at least one PUCCH resource pair which is not overlapped.

Accordingly, the PUCCH resource pairs may be grouped into two groups: an overlapped group 401 and a non-overlapped group 402. If there is only one non-overlapping PUCCH resource pair, the UE transmits the two PUCCH resources in the non-overlapping PUCCH resource pair together. If there are more than one non-overlapping PUCCH resource pairs, it may be up to UE's implementation to select a non-overlapping PUCCH resource pair, or a non-overlapping PUCCH resource pair to be transmitted may be selected according to some predefined rules. For example, the non-overlapping PUCCH resource pair of the highest priority (i.e. carrying CSI of the highest priority) is selected. If there are multiple non-overlapping PUCCH resource pairs with the same priority, it may be up to UE's implementation to select a non-overlapping PUCCH resource pair.

In the example shown in FIG. 4b, PUCCH resource pair 2 (PUCCH resource 1, PUCCH resource 4) and PUCCH resource pair 4 (PUCCH resource 2, PUCCH resource 4) are both non-overlapping. Since PUCCH resource 2 in PUCCH resource pair 4 has the highest priority (e.g. Priority 1), the UE selects PUCCH resource pair 4 to be transmitted and drops PUCCH resource 1 and PUCCH resource 3.

Case 2-2

In Case 2-2, there are two PUCCH resource determined for TRP 1 and one PUCCH resource determined for TRP 2 in Step 1.

According to Step 1, this case corresponds to the situation that there are only CSIs associated with TRP 1 expected to be transmitted and the multi-CSI-PUCCH resource list is not configured. For TRP 2, this case corresponds to one of the situations: there are only CSIs associated with TRP 2 expected to be transmitted (Case 1-1); the UCIs associated with TRP 2 and expected to the transmitted include the CSI and the HARQ-ACK corresponding to SPS PDSCH (Case 1-2); and the UCIs associated with TRP 2 and expected to the transmitted include the HARQ-ACK corresponding to PDSCH with PDCCH scheduling and other UCIs (Case 1-3). Similar to Case 2-1, there are two ways to determine the PUCCH resources to be transmitted according to different limitations.

Limitation 1: The maximum number of PUCCH resources transmitted in a time interval is 2 on the UE side; and there is no limitation of number PUCCH resources on the TRP side.

Figure 5A:
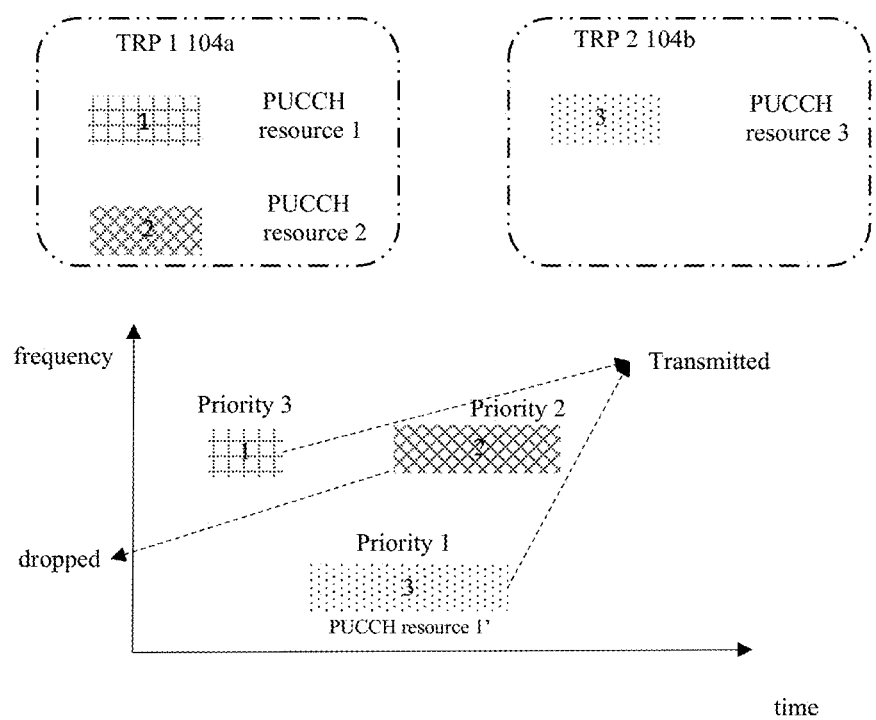
FIG. 5a is a schematic diagram illustrating UCI multiplexing in PUCCH resources for multiple TRPs according to one embodiment.

At most two non-overlapping PUCCH resources may be selected from the three PUCCH resources determined based on a priority of each PUCCH resource. FIG. 5a illustrating UCI multiplexing in PUCCH resources for multiple TRPs shows an example of Case 2-2 with Limitation 1. In the example, it is assumed that PUCCH resource 1 and PUCCH resource 2 are determined for CSI only transmission associated with TRP 1 104a; PUCCH resource 3 is determined for TRP 2 104b; and their priorities are as shown in FIG. 5a.

The UE first, among all the PUCCH resources determined in Step 1, selects one PUCCH resource, named as PUCCH resource 1' (which is PUCCH resource 3 in this scenario), which has the highest priority (e.g. Priory 1), to be transmitted. Then, the UE further selects at most one PUCCH resource from the remaining PUCCH resources which are not overlapped with PUCCH resource 1' to be transmitted. The selected at most one PUCCH resource is of a higher priority among the remaining two PUCCH resources which are not overlapped with PUCCH resource 1'. If there are two PUCCH resources corresponding to different TRPs having the same priority (carrying CSIs of the same priority) to choose from, the UE may select the PUCCH resource associated with the lowest index of CORESET group or it is up to UE's implementation. In the example shown in FIG. 5a, after selecting PUCCH resource 1' with Priority 1, there is one remaining PUCCH resource that is not overlapped with PUCCH resource 1': PUCCH resource 1. Thus, PUCCH resource 3 and PUCCH resource 1 are selected to be transmitted by the UE and the other PUCCH resource 2 is dropped.

It is possible that only one PUCCH resource (PUCCH resource 1') is selected to be transmitted by the UE if the remaining PUCCH resources are all overlapped with the selected PUCCH resource 1'.

It should also be noted that it is possible that the UE may select two PUCCH resources associated with a same TRP in this scenario.

Limitation 2: The maximum number of PUCCH resources transmitted in a time interval is 2 on the UE side; and the maximum number of PUCCH resources associated with one TRP is 1.

In this scenario, the UE selects at most two PUCCH resources that are associated with different TRPs and are not overlapped to be transmitted. The UE determines a plurality of PUCCH resource pairs, each PUCCH resource pair consisting of a PUCCH resource associated with one TRP (e.g. TRP 1) and a PUCCH resource associated with the other TRP (e.g. TRP 2), and selects a non-overlapping pair from the PUCCH resource pairs. The non-overlapping pair includes two PUCCH resources that are not overlapped in time domain.

Figure 5B:
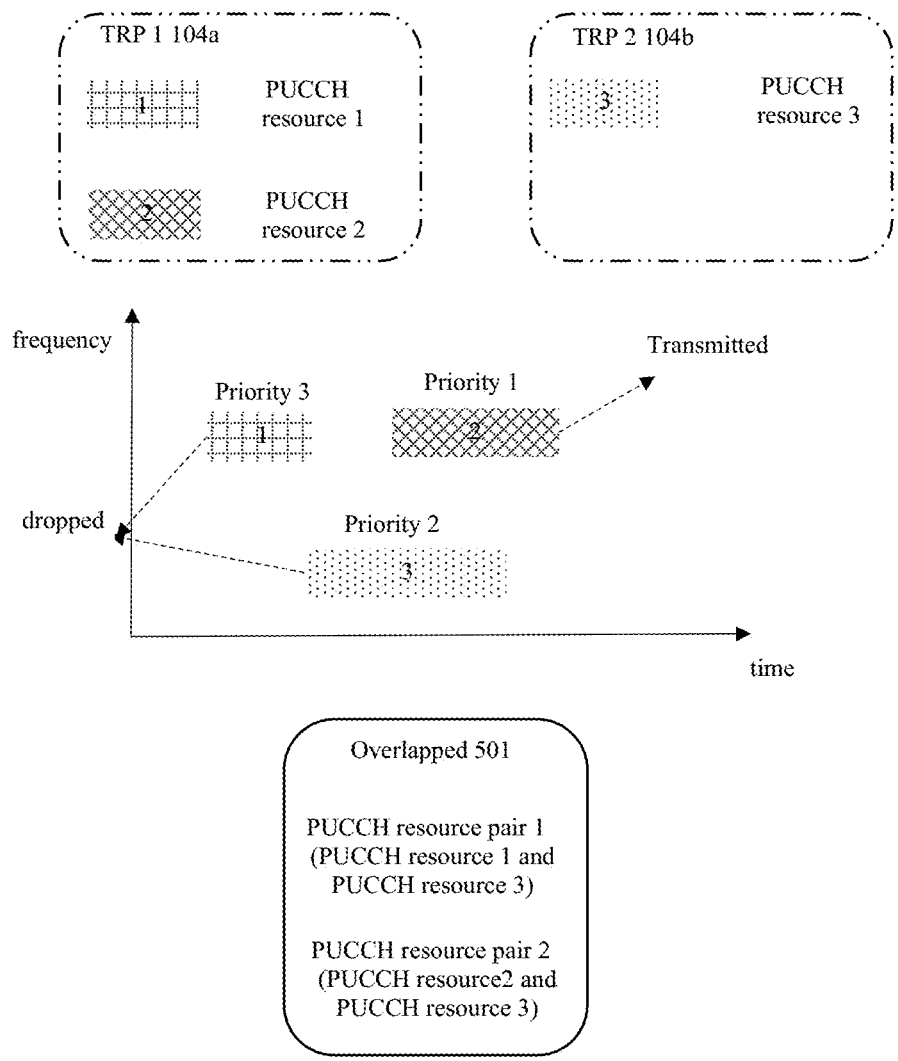
FIG. 5b is a schematic diagram illustrating UCI multiplexing in PUCCH resources for multiple TRPs according to one embodiment.

FIG. 5b illustrating UCI multiplexing in PUCCH resources for multiple TRPs is an example of Case 2-2 with Limitation 2. In the example, it is assumed that PUCCH resource 1 and PUCCH resource 2 are determined for CSI only transmission associated with TRP 1 104a; PUCCH resource 3 is determined for TRP 2 104b; and their priorities are as shown in FIG. 5b. There are 2 PUCCH resource pairs composed of two PUCCH resources associated with different TRPs: PUCCH resource pair 1 (PUCCH resource 1, PUCCH resource 3), and PUCCH resource pair 2 (PUCCH resource 2, PUCCH resource 3). If there is only one non-overlapping PUCCH resource pair, the UE transmits the two PUCCH resources in the non-overlapping PUCCH resource pair together. If there are more than one non-overlapping PUCCH resource pairs, it may be up to UE's implementation to select a non-overlapping PUCCH resource pair, or a non-overlapping PUCCH resource pair to be transmitted may be selected according to some predefined rules. For example, the non-overlapping PUCCH resource pair of the highest priority is selected. If there are multiple non-overlapping PUCCH resource pairs with the same priority to choose from, it may be up to UE's implementation to select a non-overlapping PUCCH resource pair. However, if non-overlapping PUCCH resource pair is not present, the UE selects and transmits the PUCCH resource having the highest priority.

In the example shown in FIG. 5b, PUCCH resource pair 1 (PUCCH resource 1, PUCCH resource 3) and PUCCH resource pair 2 (PUCCH resource 21, PUCCH resource 3) are both overlapping PUCCH resource pairs 501. Therefore, the UE transmits PUCCH resource 2 which has the highest priority (e.g. Priority 1) and drops the other two PUCCH resources.

Case 2-3

In Case 2-3, there are one PUCCH resource determined for TRP 1 and one PUCCH resource determined for TRP 2 in Step 1.

According to Step 1, for either TRP 1 or TRP 2, this case corresponds to one of the situations: there are only CSIs associated with the TRP expected to be transmitted (Case 1-1); the UCIs associated with the TRP and expected to the transmitted include the CSI and the HARQ-ACK corresponding to SPS PDSCH (Case 1-2); and the UCIs associated with the TRP and expected to the transmitted include the HARQ-ACK corresponding to PDSCH with PDCCH scheduling and other UCIs (Case 1-3).

Since only one PUCCH resource per TRP is determined in Step 1, in this case, the ways to select the PUCCH resource(s) according to the two different limitations are the same.

Figure 6:
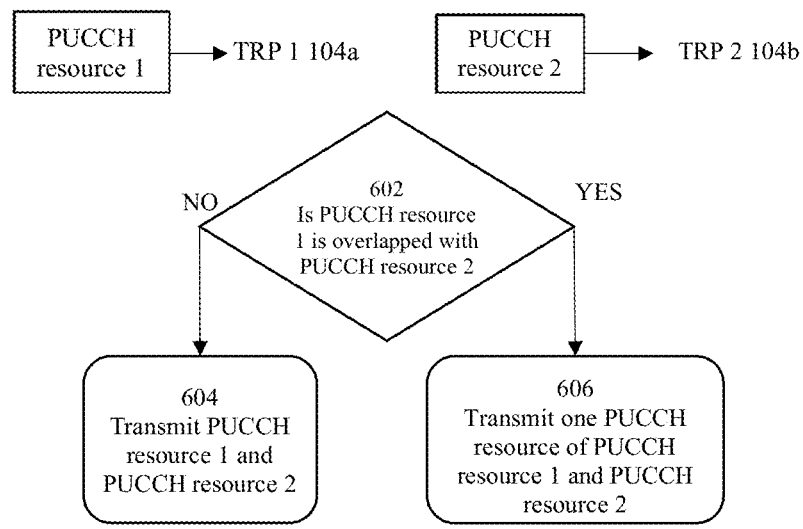
FIG. 6 is a schematic diagram illustrating UCI multiplexing in PUCCH resources for multiple TRPs according to one embodiment.

FIG. 6 illustrating UCI multiplexing in PUCCH resources for multiple TRPs shows an example of Case 2-3. In this example, it is assumed that PUCCH resource 1 is determined for TRP 1 104*a* and PUCCH resource 2 is determined for TRP 2 104*b*. As shown in FIG. 6, the UE first determines whether PUCCH resource 1 is overlapped with PUCCH resource 2 601. As only two PUCCH resources are determined for both TRPs in this case, the UE can transmit both PUCCH resources (PUCCH resource 1 and PUCCH resource 2) if they are not overlapped 604. If the two PUCCH resources are overlapped, the UE selects the PUCCH resource with a higher priority to be transmitted and drops the other PUCCH resource 606. If the two PUCCH resources corresponding to different TRPs have the same priority, the UE selects the PUCCH resource associated with a lower index of CORESET group or it is up to UE's implementation.

If candidate PUCCH resources are used and can be selected to be transmitted, there are one determined PUCCH resource and one candidate PUCCH resource determined for a TRP when the UCIs associated with the TRP include at least HARQ-ACK (e.g. Case 1-2 and Case 1-3). In Step 2, there are further three different cases of selecting PUCCH resource(s) to be transmitted by the UE when candidate PUCCH resources are used and can be selected to be transmitted.

Case 2-4

In Case 2-4, there are one determined PUCCH resource and one candidate PUCCH resource determined for TRP 1, and two PUCCH resource determined for TRP 2.

According to Step 1, this case corresponds to the UCIs associated with TRP 1 include HARQ-ACK (Case 1-2 or Case 1-3) for TRP 1. For TRP 2, this case corresponds to the situation that there are only CSIs associated with TRP 2 and the multi-CSI-PUCCH resource list is not configured (Case 1-1b).

Since the determined PUCCH resource and its corresponding candidate PUCCH resource for TRP 1 are not transmitted simultaneously (i.e. only one of the determined PUCCH resource and its corresponding candidate PUCCH resource is selected to be transmitted) and the PUCCH resources associated with TRP 1 (carrying at least HARQ-ACK) have higher priorities than the PUCCH resources associated with TRP 2 (carrying only CSI), the ways to select the PUCCH resource(s) according to the two different limitations are the same.

Figure 7:
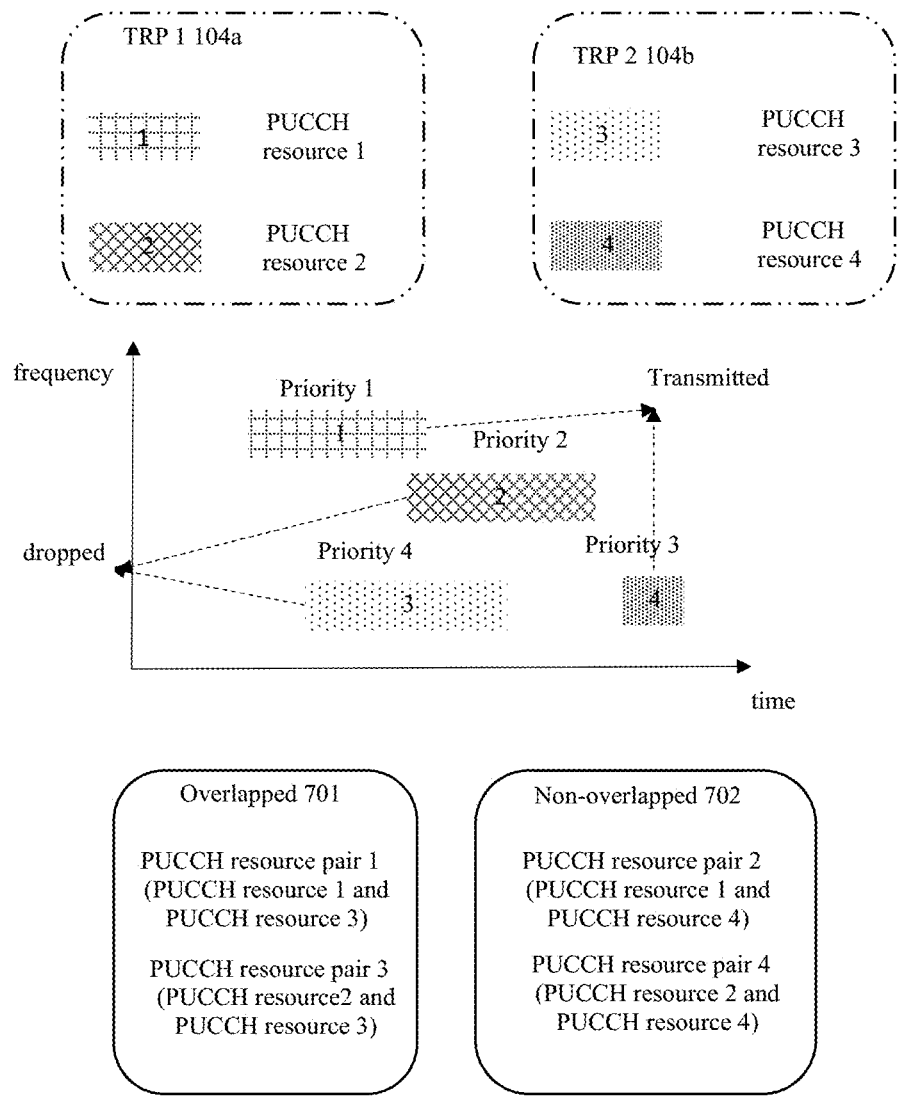
FIG. 7 is a schematic diagram illustrating UCI multiplexing in PUCCH resources for multiple TRPs according to one embodiment.

FIG. 7 illustrating UCI multiplexing in PUCCH resources for multiple TRPs shows an example of Case 2-4. In the example, it is assumed that the determined PUCCH resource is PUCCH resource 1 and the candidate PUCCH resource is PUCCH resource 2 for TRP 1 104*a*; PUCCH resource 3 and PUCCH resource 4 are determined for CSI only transmission associated with TRP 2 104*b*; and their priorities are as shown in FIG. 7.

The UE selects at most two PUCCH resources that are associated with different TRPs and are not overlapped to be transmitted. There are 4 PUCCH resource pairs composed of two PUCCH resources associated with different TRPs: PUCCH resource pair 1 (PUCCH resource 1, PUCCH resource 3), PUCCH resource pair 2 (PUCCH resource 1, PUCCH resource 4), PUCCH resource pair 3 (PUCCH resource 2, PUCCH resource 3), and PUCCH resource pair 4 (PUCCH resource 2, PUCCH resource 4). The PUCCH resource pairs may be grouped into two groups: an overlapped group 701 and a non-overlapped group 702. If there is only one non-overlapping PUCCH resource pair, the UE transmits the two PUCCH resources in the non-overlapping PUCCH resource pair together. If there are more than one non-overlapping PUCCH resource pairs, it may be up to UE's implementation to select a non-overlapping PUCCH resource pair, or a non-overlapping PUCCH resource pair to be transmitted may be selected according to some predefined rules. For example, the non-overlapping PUCCH resource pair of the highest priority is selected. However, if non-overlapping PUCCH resource pair is not present, the UE selects and transmits the PUCCH resource having the highest priority.

In the example shown in FIG. 7, PUCCH resource pair 2 (PUCCH resource 1, PUCCH resource 4) and PUCCH resource pair 4 (PUCCH resource 2, PUCCH resource 4) are both non-overlapping. Since PUCCH resource 4 is included in both PUCCH resource pairs 2 and 4, while PUCCH resource 1 in PUCCH resource pair 2 has a higher priority than PUCCH resource 2 in PUCCH resource pair 4, the UE selects PUCCH resource pair 2 to be transmitted based on the priority and drops the other two PUCCH resources.

Case 2-5

In Case 2-5, there are one determined PUCCH resource and one candidate PUCCH resource determined for TRP 1 and one PUCCH resource determined for TRP 2.

According to Step 1, this case corresponds to UCIs associated with TRP 1 include at least HARQ-ACK (Case 1-2 or Case 1-3) for TRP 1. For TRP 2, this case corresponds to the situation that there are only CSIs associated with TRP 2 to be transmitted (Case 1-1).

Since the determined PUCCH resource and its corresponding candidate PUCCH resource for TRP 1 are not transmitted simultaneously (i.e. only one of the determined PUCCH resource and its corresponding candidate PUCCH resource is selected to be transmitted) and the PUCCH resources associated with TRP 1 (carrying at least HARQ-ACK) have higher priorities than the PUCCH resources associated with TRP 2 (carrying only CSI), the ways to select the PUCCH resource(s) according to the two different limitations are the same.

Figure 8:
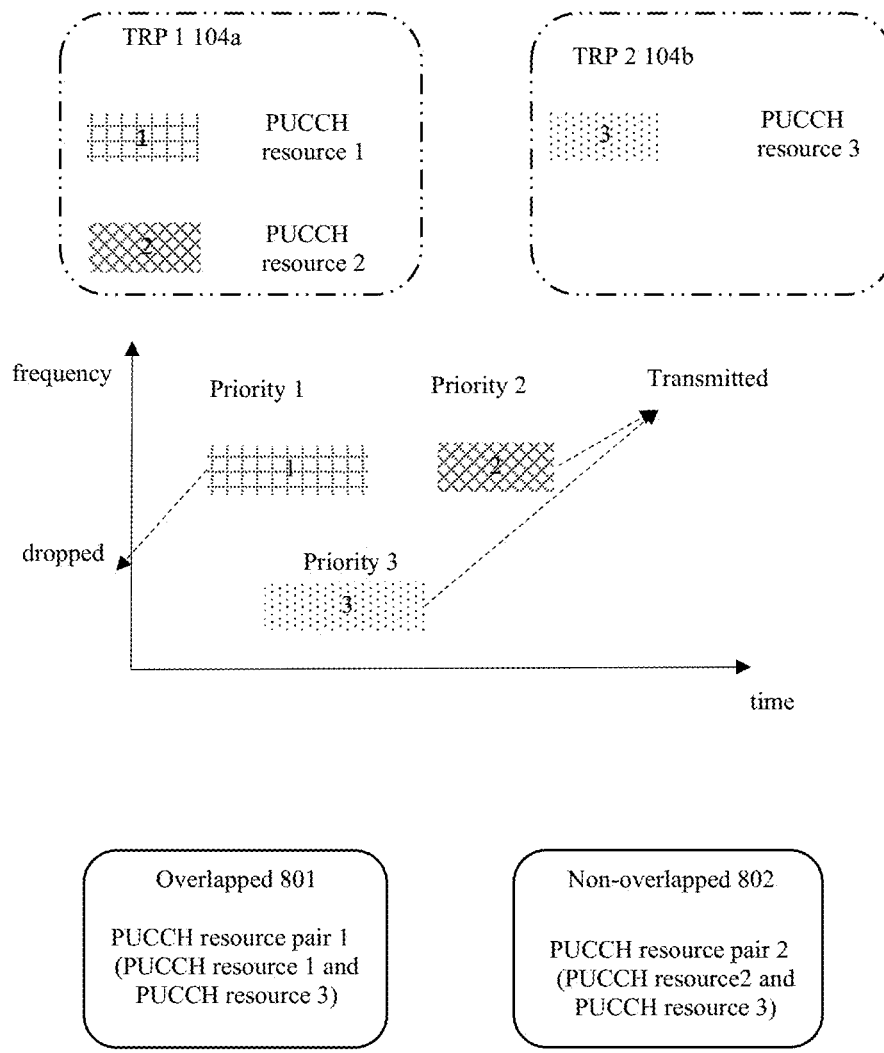
FIG. 8 is a schematic diagram illustrating UCI multiplexing in PUCCH resources for multiple TRPs according to one embodiment.

FIG. 8 illustrating UCI multiplexing in PUCCH resources for multiple TRPs shows an example of Case 2-5. In the example, it is assumed that the determined PUCCH resource is PUCCH resource 1 and the candidate PUCCH resource is PUCCH resource 2 for TRP 1 104*a*; PUCCH resource 3 is determined for CSI only transmission associated with TRP 2 104*b*; and their priorities are as shown in FIG. 8.

The UE selects at most two PUCCH resources that are associated with different TRPs and are not overlapped to be transmitted. There are 2 PUCCH resource pairs composed of two PUCCH resources associated with different TRPs: PUCCH resource pair 1 (PUCCH resource 1, PUCCH resource 3), and PUCCH resource pair 2 (PUCCH resource 2, PUCCH resource 3). The PUCCH resource pairs may be grouped into two groups: an overlapped group 801 and a non-overlapped group 802. If there is only one non-overlapping PUCCH resource pair, the UE transmits the two PUCCH resources in the non-overlapping PUCCH resource pair together. If there are more than one non-overlapping PUCCH resource pairs, it may be up to UE's implementation to select a non-overlapping PUCCH resource pair, or a non-overlapping PUCCH resource pair to be transmitted may be selected according to some predefined rules. For example, the non-overlapping PUCCH resource pair of the highest priority is selected. However, if non-overlapping PUCCH resource pair is not present, the UE selects and transmits the PUCCH resource having the highest priority.

In the example shown in FIG. 8, PUCCH resource pair 1 (PUCCH resource 1, PUCCH resource 2) is overlapped but PUCCH resource pair 2 (PUCCH resource 1, PUCCH resource 3) is not overlapped. Therefore, the UE selects PUCCH resource pair 2 to be transmitted and drops PUCCH resource 1.

Case 2-6

In Case 2-6, there are one determined PUCCH resource and one candidate PUCCH resource determined for TRP 1, and one determined PUCCH resource and one candidate PUCCH resource determined for TRP 2.

According to Step 1, this case corresponds to UCIs associated with TRP 1 and TRP 2 both include HARQ-ACK (Case 1-2 or Case 1-3).

Since the determined PUCCH resource and its corresponding candidate PUCCH resource for TRP 1 or TRP 2 are not transmitted simultaneously, the ways to select the PUCCH resource(s) according to the two different limitations are the same.

Figure 9:
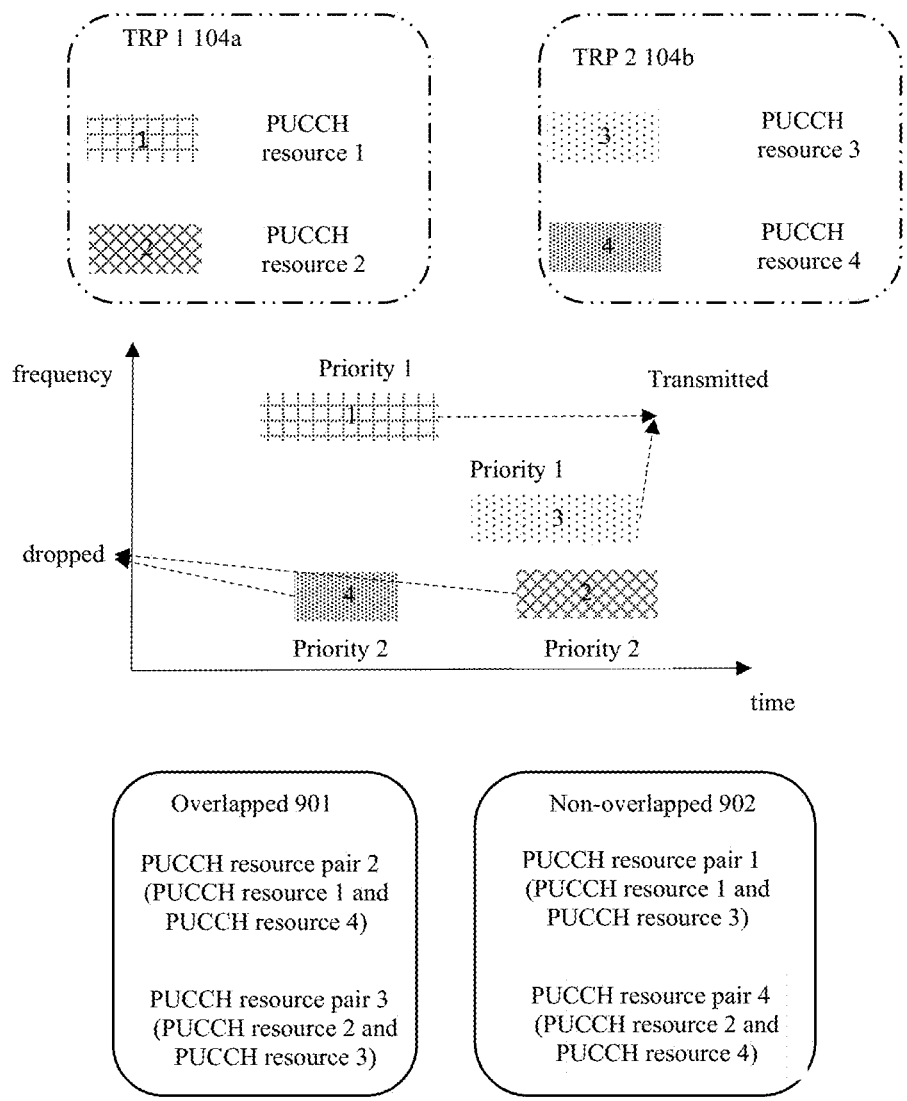
FIG. 9 is a schematic diagram illustrating UCI multiplexing in PUCCH resources for multiple TRPs according to one embodiment.

FIG. 9 illustrating UCI multiplexing in PUCCH resources for multiple TRPs shows an example of Case 2-6. In the example, it is assumed that the determined PUCCH resource is PUCCH resource 1 and the candidate PUCCH resource is PUCCH resource 2 for TRP 1 104a; the determined PUCCH resource is PUCCH resource 3 and the candidate PUCCH resource is PUCCH resource 4 for TRP 2 104b; and their priorities are as shown in FIG. 9.

The UE selects at most two PUCCH resources that are associated with different TRPs and are not overlapped to be transmitted. There are 4 PUCCH resource pairs composed of two PUCCH resources associated with different TRPs: PUCCH resource pair 1 (PUCCH resource 1, PUCCH resource 3), PUCCH resource pair 2 (PUCCH resource 1, PUCCH resource 4), PUCCH resource pair 3 (PUCCH resource 2, PUCCH resource 3), and PUCCH resource pair 4 (PUCCH resource 2, PUCCH resource 4). The PUCCH resource pairs may be grouped into two groups: an overlapped group 901 and a non-overlapped group 902. If there is only one non-overlapping PUCCH resource pair, the UE transmits the two PUCCH resources in the non-overlapping PUCCH resource pair together. If there are more than one non-overlapping PUCCH resource pairs, it may be up to UE's implementation to select a non-overlapping PUCCH resource pair, or a non-overlapping PUCCH resource pair to be transmitted may be selected according to some predefined rules. For example, the non-overlapping PUCCH resource pair of the highest priority is selected. However, if non-overlapping PUCCH resource pair is not present, the UE selects and transmits the PUCCH resource having the highest priority. If there are multiple PUCCH resources having the same highest priority to be selected, it may be up to UE's implementation to select the PUCCH resource or the PUCCH resource associated with a lower index of CORESET group is selected to be transmitted.

In the example shown in FIG. 9, PUCCH resource pair 1 (PUCCH resource 1, PUCCH resource 3) and PUCCH resource pair 4 (PUCCH resource 2, PUCCH resource 4) are both non-overlapping. Since the PUCCH resources in PUCCH resource pair 1 have higher priorities than the PUCCH resources in PUCCH resource pair 4, the UE selects PUCCH resource pair 1 (PUCCH resource 1 and PUCCH resource 3) to be transmitted and drops PUCCH resources 2 and 4.

For Case 2-4, Case 2-5 and Case 2-6, where the UCIs associated with at least one TRP include at least HARQ-ACK and candidate PUCCH resources are used and can be selected to be transmitted, the UE selects at most two PUCCH resources that are associated with different TRPs and are not overlapped to be transmitted. The UE determines a plurality of PUCCH resource pairs, each PUCCH resource pair consisting of a PUCCH resource associated with one TRP (e.g. TRP 1) and a PUCCH resource associated with the other TRP (e.g. TRP 2), and selects a non-overlapping pair from the PUCCH resource pairs. The non-overlapping pair includes two PUCCH resources that are not overlapped in time domain. If there are more than one non-overlapping PUCCH resource pairs, the non-overlapping PUCCH resource pair of the highest priority is selected. If there is no non-overlapping pair, the UE selects the PUCCH resource having the highest priority from the PUCCH resources associated with the two TRPs.

The above discussion is focused on the UE side. Because each of the PUCCH resources determined in Step 1 can be either transmitted or dropped by the UE, a TRP may not receive all the PUCCH resources targeting itself that are determined in Step 1 in the same time interval. If candidate PUCCH resources can be transmitted on the UE side, the TRP should detect HARQ-ACK in the candidate PUCCH resource if it does not detect the PUCCH resource determined in Case 1-2 and Case 1-3.

Figure 10:
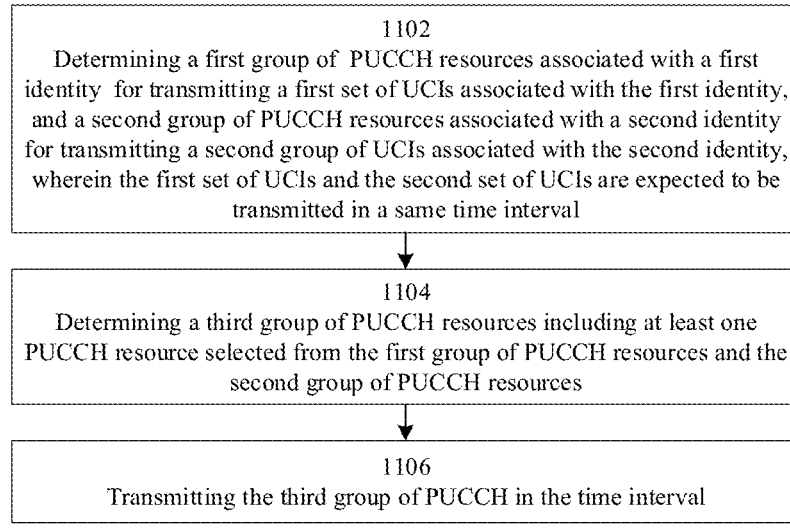
FIG. 10 is a flow chart illustrating steps of UCI multiplexing in PUCCH resources for multiple TRPs on a UE side according to one embodiment.

FIG. 10 is a flow chart illustrating steps of UCI multiplexing in PUCCH resources for multiple TRPs on the UE side.

At Step 1002, the processor 202 on the UE side determines a first group of Physical Uplink Control Channel (PUCCH) resources associated with a first identity (e.g. TRP 1) for transmitting a first set of Uplink Control Information (UCIs) associated with the first identity, and a second group of PUCCH resources associated with a second identity (e.g. TRP 2) for transmitting a second group of UCIs associated with the second identity, wherein the first set of UCIs and the second set of UCIs are expected to be transmitted in a same time interval.

In one embodiment, the processor 202 may determine that the first group of PUCCH resources include a plurality of PUCCH resources or one PUCCH resource, upon determining that the first set of UCIs includes only CSI. The processor 202 may determine that the second group of PUCCH resources include a plurality of PUCCH resources or one PUCCH resource, upon determining that the first set of UCIs includes only CSI.

In one embodiment, upon determining that the first set of UCIs includes HARQ-ACK, the processor 202 multiplexes the first set of UCIs into a first determined PUCCH resource; and the first group of PUCCH resources includes the first determined PUCCH resource). In some case, the first group of PUCCH resources may include only one PUCCH resource, i.e. the first determined PUCCH resource. In the embodiment, upon determining that the second set of UCIs includes HARQ-ACK, the processor 202 multiplexes the second set of UCIs into a second determined PUCCH resource; and the second group of PUCCH resources includes the second determined PUCCH resource). In some case, the second group of PUCCH resources may include only one PUCCH resource, i.e. the second determined PUCCH resource.

In another embodiment, the processor 202 may determine that the first group of PUCCH resources further includes a first candidate PUCCH resource for carrying only the HARQ-ACK associated with the first identity. The processor 202 may determine that the second group of PUCCH resources further includes a second candidate PUCCH resource for carrying only the HARQ-ACK associated with the second identity.

At Step 1004, the processor 202 on the UE side further determines a third group of PUCCH resources including at least one PUCCH resource selected from the first group of PUCCH resources and the second group of PUCCH resources.

The processor 202 determines the third group of PUCCH resources to be transmitted according to the cases discussed in Step 2.

At Step 1006, the transmitter 212 on the UE side transmits the third group of PUCCH in the time interval.

Figure 11:
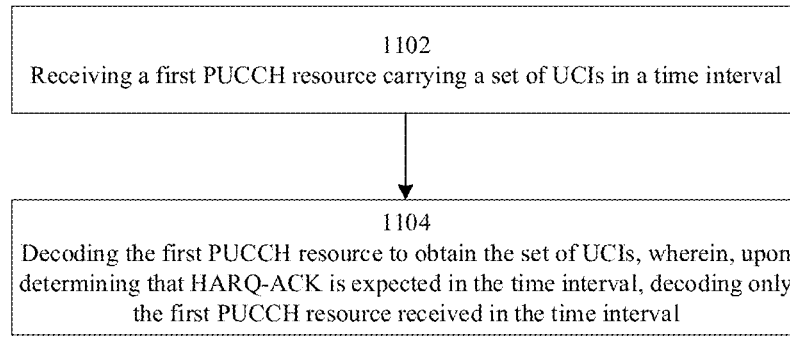
FIG. 11 is a flow chart illustrating steps of receiving UCIs multiplexed in PUCCH resources for multiple TRPs according to one embodiment.

FIG. 11 is a flow chart illustrating steps of receiving UCIs multiplexed in PUCCH resources for multiple TRPs by a TRP.

At step 1102, the receiver 314 on the TRP side receives a first Physical Uplink Control Channel (PUCCH) resource carrying a set of Uplink Control Information (UCIs) in a time interval.

At step 1104, the processor 302 on the TRP side decodes the first PUCCH resource to obtain the set of UCIs, wherein, upon determining that Hybrid Automatic Repeat Request Acknowledgement (HARQ-ACK) is expected in the time interval, the processor decodes only the first PUCCH resource received in the time interval.

Figure 12:
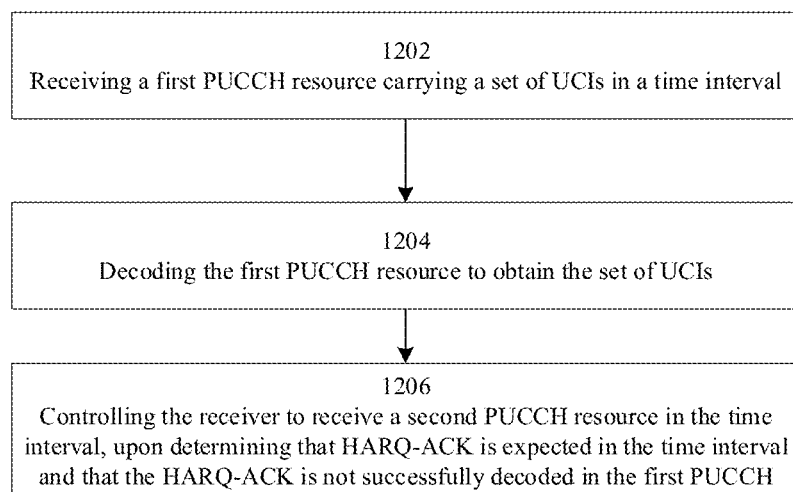
FIG. 12 is a flow chart illustrating steps of receiving UCIs multiplexed in PUCCH resources for multiple TRPs according to one embodiment.

FIG. 12 is a flow chart illustrating steps of receiving UCIs multiplexed in PUCCH resources for multiple TRPs by a TRP.

At step 1202, the receiver 314 on the TRP side receives a first Physical Uplink Control Channel (PUCCH) resource carrying a set of Uplink Control Information (UCIs) in a time interval.

At step 1204, the processor 302 on the TRP side decodes the first PUCCH resource to obtain the set of UCIs.

At step 1206, the processor 302 on the TRP side controls the receiver 314 to receive a second PUCCH resource in the time interval, upon determining that Hybrid Automatic Repeat Request Acknowledgement (HARQ-ACK) is expected in the time interval and that the HARQ-ACK is not successfully decoded in the first PUCCH.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A user equipment (UE) for wireless communication, comprising:
    at least one memory; and
    at least one processor coupled with the at least one memory and operable to cause the UE to:
        determine a first plurality of uplink control channel resources is associated with a first identity, wherein the first plurality of uplink control channel resources is allocated for transmitting a first uplink control information;
        determine a second plurality of uplink control channel resources is associated with a second identity, wherein the second plurality of uplink control channel resources is allocated for transmitting a second uplink control information, wherein the first uplink control information and the second uplink control information are scheduled for transmission in a time interval;
        determine a plurality of uplink control channel resource pairs, wherein respective uplink control channel resource pairs of the plurality of uplink control channel resource pairs comprise an uplink control channel resource of the first plurality of uplink control channel resources and an uplink control channel resource of the second plurality of uplink control channel resources;
        select an uplink control channel resource pair from the plurality of uplink control channel resource pairs, wherein the uplink control channel resource pair comprises two uplink control channel resources that are non-overlapping in a time domain; and
        transmit the uplink control channel resource pair in the time interval.

2. The UE of claim 1, wherein the first identity is associated with a first control resource set group and the second identity is associated with a second control resource set group.

3. The UE of claim 1, wherein the at least one processor is further operable to cause the UE to:
    multiplex, responsive to the first uplink control information comprising a first hybrid automatic repeat request acknowledgement associated with the first identity, the first uplink control information into one or more uplink control channel resources of the first plurality of uplink control channel resources; and
    multiplex, responsive to the second uplink control information comprising a second hybrid automatic repeat request acknowledgement, the second uplink control information into one or more uplink control channel resources of the second plurality of uplink control channel resources.

4. The UE of claim 3, wherein the at least one processor is further operable to cause the UE to:
    transmit both the one or more uplink control channel resources of the first plurality of uplink control channel resources and the one or more uplink control channel resources of the second plurality of uplink control channel resources in the time interval based at least in part on the one or more uplink control channel resources of the first plurality of uplink control channel resources and the one or more uplink control channel resources of the second plurality of uplink control channel resources being non-overlapping; or transmit one of the one or more uplink control channel resources of the first plurality of uplink control channel resources or the one or more uplink control channel resources of the second plurality of uplink control channel resources in the time interval based at least in part on the one or more uplink control channel resources of the first plurality of uplink control channel resources and the one or more uplink control channel resources of the second plurality of uplink control channel resources being overlapping.

5. The UE of claim 3, wherein the at least one processor is further operable to cause the UE to determine a first candidate uplink control channel resource for carrying the first hybrid automatic repeat request acknowledgement and a second candidate uplink control channel resource for carrying the second hybrid automatic repeat request acknowledgement.

6. The UE of claim 5, wherein the first plurality of uplink control channel resources comprises the first candidate uplink control channel resource and the second plurality of uplink control channel resources comprises the second candidate uplink control channel resource.

7. The UE of claim 5, wherein the at least one processor is further operable to cause the UE to determine the one or more uplink control channel resources of the first plurality of uplink control channel resources and the one or more uplink control channel resources of the second plurality of uplink control channel resources based at least in part on at least one of a payload size of the first uplink control information or a payload size of the second uplink control information, a respective downlink control information associated with the first hybrid automatic repeat request acknowledgement or the second hybrid automatic repeat request acknowledgement, or an uplink control information priority associated with the first uplink control information or the second uplink control information.

8. The UE of claim 5, wherein the first plurality of uplink control channel resources comprises the first candidate uplink control channel resource and the second plurality of uplink control channel resources comprises the second candidate uplink control channel resource.

9. The UE of claim 1, wherein the at least one processor is further operable to cause the UE to select two non-overlapped uplink control channel resources from the first plurality of uplink control channel resources and the second plurality of uplink control channel resources based at least in part on a priority of the two non-overlapped uplink control channel resources, wherein the uplink control channel resource pair comprises the two non-overlapped uplink control channel resources.

10. The UE of claim 1, wherein to select the uplink control channel resource pair, the at least one processor is operable to cause the UE to select the uplink control channel resource pair with a highest priority.

11. The UE of claim 1, wherein the at least one processor is further operable to cause the UE to:
determine an additional plurality of uplink control channel resource pairs, wherein respective uplink control channel resource pairs of the additional plurality of uplink control channel resource pairs comprise the uplink control channel resource of the first plurality of uplink control channel resources and a same uplink control channel resource of the second plurality of uplink control channel resources;
select a non-overlapping pair from the additional plurality of uplink control channel resource pairs; and
transmit the non-overlapping pair from the additional plurality of uplink control channel resource pairs.

12. A network equipment (NE) for wireless communication, comprising:
at least one memory; and
at least one processor coupled with the at least one memory and operable to cause the NE to:
receive, in a time interval, an uplink control channel resource pair carrying first uplink control information and second uplink control information, wherein the uplink control channel resource pair comprises two uplink control channel resources that are non-overlapping in a time domain, wherein the uplink control channel resource pair comprises an uplink control channel resource of a first plurality of uplink control channel resources and an uplink control channel resource of a second plurality of uplink control channel resources, and wherein the first plurality of uplink control channel resources is allocated for transmitting the first uplink control information and the second plurality of uplink control channel resources is allocated for transmitting the second uplink control information; and
decode the uplink control channel resource of the first plurality of uplink control channel resources based at least in part on a hybrid automatic repeat request acknowledgement being expected in the time interval.

13. The NE of claim 12, wherein channel state information comprises the hybrid automatic repeat request acknowledgement based at least in part on the hybrid automatic repeat request acknowledgement corresponding to a semi-persistent scheduling physical downlink shared channel, and wherein the uplink control channel resource of the first plurality of uplink control channel resources has a highest priority of uplink control channel resources associated with the channel state information.

14. The NE of claim 12, wherein the uplink control channel resource of the first plurality of uplink control channel resources is based at least in part on a payload size of the hybrid automatic repeat request acknowledgement and other uplink control information expected to be received in the time interval and an uplink control channel resource indicator in a corresponding downlink control channel.

15. A network equipment (NE) for wireless communication, comprising:
at least one memory; and
at least one processor coupled with the at least one memory and operable to cause the NE to:
receive, in a time interval, an uplink control channel resource pair carrying first uplink control information and second uplink control information, wherein the uplink control channel resource pair comprises two uplink control channel resources that are non-overlapping in a time domain, wherein the uplink control channel resource pair comprises an uplink control channel resource of a first plurality of uplink control channel resources and an uplink control channel resource of a second plurality of uplink control channel resources, and wherein the first plurality of uplink control channel resources is allocated for transmitting the first uplink control information and the second plurality of uplink control channel resources is allocated for transmitting the second uplink control information;
decode the uplink control channel resource of the first plurality of uplink control channel resources based at least in part on a hybrid automatic repeat request acknowledgement being expected in the time interval; and
decode the uplink control channel resource of the second plurality of uplink control channel resources based at least in part on failing to decode the hybrid automatic repeat request acknowledgement in the uplink control channel resource of the first plurality of uplink control channel resources.

16. The NE of claim 15, wherein the uplink control channel resource of the second plurality of uplink control channel resources is a candidate uplink control channel resource carrying the hybrid automatic repeat request acknowledgement.

17. The NE of claim 16, wherein the uplink control channel resource of the second plurality of uplink control channel resources is configured by higher layers for the hybrid automatic repeat request acknowledgement, and wherein the hybrid automatic repeat request acknowledgement corresponds to a semi-persistent scheduling downlink shared channel.

18. The NE of claim 16, wherein the uplink control channel resource of the second plurality of uplink control channel resources is based at least in part on a payload size of the hybrid automatic repeat request acknowledgement corresponding to a downlink shared channel associated with a downlink control channel and an uplink control channel resource indicator in the downlink control channel.

19. A method performed by a user equipment (UE), the method comprising:
   determining a first plurality of uplink control channel resources is associated with a first identity, wherein the first plurality of uplink control channel resources is allocated for transmitting a first uplink control information;
   determining a second plurality of uplink control channel resources is associated with a second identity, wherein the second plurality of uplink control channel resources is allocated for transmitting a second uplink control information, wherein the first uplink control information and the second uplink control information are scheduled for transmission in a time interval;
   determining a plurality of uplink control channel resource pairs, wherein respective uplink control channel resource pairs of the plurality of uplink control channel resource pairs comprise an uplink control channel resource of the first plurality of uplink control channel resources and an uplink control channel resource of the second plurality of uplink control channel resources;
   selecting an uplink control channel resource pair from the plurality of uplink control channel resource pairs, wherein the uplink control channel resource pair comprises two uplink control channel resources that are non-overlapping in a time domain; and transmitting the uplink control channel resource pair in the time interval.

20. The method of claim 19, wherein the first identity is associated with a first control resource set group and the second identity is associated with a second control resource set group.

* * * * *